US008407741B2

(12) United States Patent
Lee et al.

(10) Patent No.: US 8,407,741 B2
(45) Date of Patent: Mar. 26, 2013

(54) SYSTEM, SERVER AND METHOD FOR PROVIDING SUPPLEMENTARY INFORMATION SERVICE RELATED TO BROADCAST CONTENT

(75) Inventors: Goon Seop Lee, Gyeonggi-do (KR); Dong Hahk Lee, Seoul (KR); Jae Hwang Yu, Seoul (KR); Jong Tae Ihm, Gyeonggi-do (KR); Se Hyun Oh, Seoul (KR); Ku Ik Chung, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 422 days.

(21) Appl. No.: 12/446,179

(22) PCT Filed: Nov. 20, 2007

(86) PCT No.: PCT/KR2007/005817
§ 371 (c)(1),
(2), (4) Date: Apr. 17, 2009

(87) PCT Pub. No.: WO2008/062979
PCT Pub. Date: May 29, 2008

(65) Prior Publication Data
US 2010/0325667 A1 Dec. 23, 2010

(30) Foreign Application Priority Data

Nov. 20, 2006 (KR) .................. 10-2006-0114828
Jan. 15, 2007 (KR) .................. 10-2007-0004176
Sep. 13, 2007 (KR) .................. 10-2007-0093200

(51) Int. Cl.
*H04N 5/445* (2011.01)
*H04N 7/173* (2011.01)
(52) U.S. Cl. ............... 725/51; 725/90; 725/93; 725/98; 725/133
(58) Field of Classification Search .............. 725/90, 725/93, 98, 116, 118, 133
See application file for complete search history.

(56) References Cited

U.S. PATENT DOCUMENTS 5,929,849 A 7/1999 Kikinis
6,006,252 A * 12/1999 Wolfe ......................... 709/203
(Continued)

FOREIGN PATENT DOCUMENTS

JP 07-321748 12/1995
JP 2001-258011 9/2001
(Continued)

OTHER PUBLICATIONS

International Search Report mailed Feb. 28, 2008 for PCT/KR2007/005817.

(Continued)

*Primary Examiner* — Kieu Oanh T Bui
(74) *Attorney, Agent, or Firm* — Lowe Hauptman Ham & Berner, LLP (57) ABSTRACT

The present invention relates to a system and method for providing a supplementary information service related to broadcast content. The system for providing a supplementary information service related to broadcast content being broadcasted to user terminal comprises a Time Information Creating Server for Identifying a start time information of the broadcast content; and a Supplementary Information Service Providing Server for receiving the start time information of the broadcast content from the Time Information Creating Server, calculating elapsed time for a specific scene based on the start time information, and providing a user terminal with an supplementary information corresponding to the scene based on the elapsed time, through a communication network. And the method for providing a supplementary information related to broadcast content being broadcasted to user terminal comprises steps of identifying a start time information of the broadcast content; calculating elapsed time for a specific scene based on the start time information; and providing a user terminal with an supplementary information corresponding to the scene based on the elapsed time, through a communication network.

16 Claims, 7 Drawing Sheets

U.S. PATENT DOCUMENTS

| | | | | |
|---|---|---|---|---|
| 6,154,771 | A | * | 11/2000 | Rangan et al. ................. 709/217 |
| 6,539,054 | B1 | * | 3/2003 | Matsui et al. ............ 375/240.08 |
| 2006/0143664 | A1 | * | 6/2006 | Hartselle et al. ................. 725/88 |

FOREIGN PATENT DOCUMENTS

| | | |
|---|---|---|
| JP | 2002-218433 | 8/2002 |
| JP | 2002-334092 | 11/2002 |
| JP | 2004-032637 | 1/2004 |
| JP | 2005-159743 | 6/2005 |
| KR | 10-2004-0098061 | 11/2004 |

OTHER PUBLICATIONS

Japanese Office Action for 2009-537089 dated Nov. 29, 2011.

* cited by examiner

SYSTEM, SERVER AND METHOD FOR PROVIDING SUPPLEMENTARY INFORMATION SERVICE RELATED TO BROADCAST CONTENT

TECHNICAL FIELD

Cross Reference to Related Applications

This application claims the priority of Korean Patent Application No. 10-2006-0114828, filed Nov. 20, 2006, Korean Patent Application No. 10-2007-0004176, filed Jan. 15, 2007, and Korean Patent Application No. 10-2007-0093200, filed Sep. 13, 2007 in the KIPO (Korean Intellectual Property Office), the disclosures of which are incorporated herein in their entirety by reference. Further, this application is the National Phase application of International Application No. PCT/KR2007/005817, filed Nov. 20, 2007, which designates the United States and was published in English. Each of these applications is hereby incorporated by reference in their entirety into the present application.

The present application is related to Korean Patent Application No. 10-2006-0114828, entitled "System and Method for Synchronization of Supplementary Information of Broadcast Content" and filed by Gun-Seop Lee et al. on Nov. 20, 2006, Korean Patent Application No. 10-2007-0004176 entitled "GUIP Service System and Method for Provision of Supplementary Information of Digital Multimedia Broadcast" and filed by Gun-Seop Lee et al. on Jan. 15, 2007, and Korean Patent Application No. 10-2007-0093200, entitled "Communication Network-Based Bidirectional Data Broadcasting Service Providing System and Method, and Server Applied to the Same" and filed by Gun-Seop Lee et al. on Sep. 13, 2007, the entire contents of which are hereby incorporated by reference.

The present invention relates, in general, to a system and method for providing a supplementary information service related to broadcast content and, more particularly, to a system and method for providing a supplementary information service related to broadcast content, which precisely match broadcast content-based supplementary information to corresponding broadcast content, which varies in real time, and then provide it to users.

The present invention relates, in general, to technology for providing a bidirectional data broadcasting service and, more particularly, to a system and method for providing a supplementary information service related to broadcast content, which can efficiently implement a bidirectional data broadcasting service, provided over a broadcasting network, over a communication network, including a mobile communication network, and a server which can be applied to the system and method.

The present invention relates, in general, to a system and method for providing supplementary information of Digital Multimedia Broadcasting (DMB) and, more particularly, to a system and method for providing supplementary information of DMB, which can provide supplementary information or content associated with persons and products on a broadcast screen through interworking between a user terminal and a supplementary information service providing server.

BACKGROUND ART

Currently, mobile data communication services include a wireless Internet service, a mobile computing service, a wireless data communication service, a wireless Internet access service, and a satellite communication service.

Of the mobile data communication services, the field of a wireless broadcasting service, which provides various types of content to Personal Digital Assistants (PDAs), is attracting attention due the diversity of business, marketability, the progression of technology, etc. Data broadcasting services are now provided by Content Providers (CPs), broadcasting service providers, and mobile communication service providers, who play key roles.

In the case of such data broadcasting services, in a method of implementing a bidirectional data broadcasting service between a broadcasting system and a user, data connection information for connection with broadcast content, which is transmitted from a broadcasting system via a broadcast channel in a broadcasting network, such as a terrestrial Digital Multimedia Broadcasting (DMB) network or a satellite DMB network, is additionally transmitted via another broadcast channel.

Thereafter, according to this conventional technology, a viewer terminal device receives all of the broadcast content and data connection information over the broadcasting network and displays them on the screen thereof. Accordingly, the viewer determines whether a data broadcasting service has started, and requests additional information by making communication network access using URL information included in the data connection information. The transmission of data connection information over a broadcasting network according to the conventional technology has a problem in that additional broadcasting frequency resources must be used, is inefficient in that information that is not wanted or requested by a number of viewers is transmitted because different information is preferred by different viewers who use a bidirectional data broadcasting service, and has restrictions on service implementation, such as the requirement to transmit the same information to all viewers.

Furthermore, even in the case where a service is implemented to provide information associated with broadcasts over a communication network, there is no provision for a method of efficiently establishing synchronization between broadcast information provided over a broadcasting network and supplementary information provided over the communication network. Accordingly, a measure for overcoming these restrictions is demanded.

Meanwhile, 'DMB service' is a mobile multimedia broadcasting service in which broadcasting and communication converge, and is a digital broadcasting service which provides CD-level quality audio and data and a high quality video service via mobile phones, PDAs, car terminals, and so on.

Currently, a DMB reception function is implemented in mobile communication terminals. Thus, mobile communication subscribers can view dramas or listen to high quality music, receive information, such as news, weather and the price index of stocks, anytime while watching television, and can view the title or words of music being listened to in the form of captions or a photo, using mobile communication terminals even on the subway or a bus.

Meanwhile, users who use this DMB service form a user group that is different from the group of existing mobile communication subscribers. Thus, the creation of a new service for this new user group is essentially demanded. Furthermore, there is a possibility of encroachment on the existing data market, such as NATE and JUNE, due to the viewing of broadcast content by DMB users. To overcome this problem, service providers who try to create new markets through the varied content convergence of DMB and communication have been very active.

Home shopping, which has grown explosively in broadcasting, such as cable TV, has now become a fundamental means for selling products. If mobile electronic commerce can be activated by combining the broadcast content of DMB with home shopping or a Product Placement (PPL) information service, the rate of use of data as well as sales can increased.

Here, the term 'PPL' is one such marketing strategy, and refers to an indirect advertising method of advertising specific products by making the products appear in movies, dramas, etc. as the movie industry grows and becomes sophisticated. The term 'PPL information service' refers to a service of, when a user selects PPL information, transmitting detailed information to the user and displaying it on a terminal in conjunction with DMB content.

However, in order to provide the PPL information service, it is necessary to associate the DMB service, that is, a unidirectional service, with the wireless Internet. To this end, the implementation of a server capable of interworking with a terminal, the creation of PPL content, and the implementation of a terminal are required.

DISCLOSURE

Summary of the Invention

Technical Problem

Accordingly, the present invention has been made keeping in mind the above problems occurring in the prior art, and an object of the present invention is to provide a system and method for providing a supplementary information service related to broadcast content, which can precisely match broadcast content-based supplementary information to corresponding broadcast content, which varies in real time, and then provide it to users.

Another object of the present invention is to provide a system and method for providing a supplementary information service related to broadcast content, which can efficiently implement a bidirectional data broadcasting service, provided over a broadcasting network, over a communication network, including a mobile communication network, and a server which can be applied to the system and method.

A further object of the present invention is to provide a system and method for providing a supplementary information service related to broadcast content, which can efficiently realize synchronization between various types of broadcast information, provided over a broadcasting network, and bidirectional data service-related supplementary information, transmitted and received over a communication network, and to a server which can be applied to the system and method.

Yet another object of the present invention is to provide a system and method for providing a supplementary information service related to broadcast content, in which a user can be provided with a Graphic User Interface in Picture (GUIP) service, in which the user can request and receive information about persons, products, etc., displayed on a broadcast screen, while watching television through a user terminal over the wireless Internet, that is, a bidirectional communication channel.

Still another object of the present invention is to provide a method of enabling a user terminal, and a supplementary information service-providing server and a content server for providing supplementary information to interwork with each other, thereby enabling, in particular, the implementation of a GUIP service, in which various pieces of information can be provided through the convergence of a DMB service and a PPL information service without changing existing broadcasting systems, thereby avoiding encroachment on the data market related to a new group of DMB users, and thereby creating a new data market.

Technical Solution

To accomplish the above objects, according to an aspect of the present invention, there is provided a system for providing a supplementary information service related to broadcast content being broadcasted to user terminal, the system comprising; a time information creating server for identifying a start time information of the broadcast content; and a supplementary information service providing server for receiving the start time information of the broadcast content from the time information creating server, calculating elapsed time for a specific scene based on the start time information, and providing a user terminal with an supplementary information corresponding to the scene based on the elapsed time, through a communication network.

Preferably, the supplementary information service providing server receives a supplementary information request and a time information of the scene from the user terminal, and calculates the elapsed time for the scene based on the start time information and the time information of the scene.

Preferably, the start time information includes an PTS information corresponding to the start time of the broadcast content.

Preferably, the time information of the scene includes a PTS information of the scene, and the supplementary information service providing server calculates the elapsed time based on the PTS information corresponding to the start time and the PTS information of the scene and extracts the supplementary information, to be provided to the user terminal, corresponding to the elapsed time.

Preferably, the start time information further includes an absolute time information, and the supplementary information service providing server extracts the supplementary information, to be provided to the user terminal, based on the elapsed time and the absolute time information.

Preferably, the supplementary information service providing server further receives the coordinate information from the user terminal and provides the user terminal the supplementary information corresponding to both of the specific scene and the coordinate information.

Preferably, the supplementary information service providing server provides the user terminal a URL information corresponding to the supplementary information to be downloaded.

Preferably, the broadcast content includes a PTS information of the scene, and the supplementary information service providing server creates a CTS information for synchronizing the PTS information of the scene with the supplementary information and provides the user terminal with the supplementary information including the CTS information.

Preferably, the broadcast content includes a PTS information of the specific scene, and the time information creating server creates a CTS information for synchronizing the PTS information of the scene with the supplementary information and provides the Supplementary information service providing server with the CTS information, and the supplementary information service providing server provides the user terminal with the supplementary information including the CTS information.

According to an aspect of the present invention, there is provided a method for providing a supplementary information related to broadcast content being broadcasted to user terminal, the method comprising steps of; identifying a start time information of the broadcast content; calculating elapsed time for a specific scene based on the start time information; and providing a user terminal with a supplementary information corresponding to the scene based on the elapsed time, through a communication network.

Preferably, the method further comprises a step of receiving a supplementary information request and a time information of the scene from the user terminal, and the elapsed time is calculated based on the start time information and the time information of the scene.

Preferably, the method further comprises a step of extracting the supplementary information, to be provided to the user terminal, corresponding to the elapsed time calculated based on the start time information and the time information of the scene, wherein the start time information includes a PTS information and an absolute time information, and the time information of the scene includes a PTS information of the scene.

Preferably, a coordinate information is further received at the step of receiving, and the supplementary information corresponding to the scene is extracted based on both of the elapsed time and the coordinate information.

Preferably, the step of providing supplementary information further comprises a step of providing the user terminal with an URL information to the supplementary information to be downloaded.

Preferably, the step of providing supplementary information further comprises a step of providing the user terminal with the supplementary information including an CTS information, wherein the broadcast content includes an PTS information of the scene, and the CTS is created for synchronizing the PTS information of the scene with the supplementary information.

Advantageous Effects

A system and method for providing a supplementary information service related to broadcast content according to an aspect of the present invention precisely match supplementary information based on each frame of broadcast content, which varies in real time, to the frame and provides the supplementary information, thereby improving the level of the satisfaction of the service of a user.

Furthermore, according to a system and method for providing a supplementary information service related to broadcast content and a server applied to the system and method according to another aspect of the present invention, a bidirectional data broadcasting service provided over a broadcasting network is efficiently implemented over a communication network, including a mobile communication network, and synchronization can be efficiently realized between various types of broadcast information, provided over a broadcasting network and bidirectional data service-related supplementary information, transmitted and received over a communication network. Accordingly, the system and method have advantages in that it is possible to flexibly deal with viewers' requests for supplementary service while watching a broadcast, implement a broadcasting service in more various ways, and further improve the commercial features of a broadcasting service using a communication network.

Furthermore, according to a system and method for providing a supplementary information service related to broadcast content according to still another aspect of the present invention, a user can be provided with a GUIP service, in which the user can request and receive information about persons, products, etc., displayed on a broadcast screen, while watching television through a user terminal over the wireless Internet, that is, a bidirectional communication channel. Furthermore, according to the present invention, various pieces of information can be provided through the convergence of a DMB service and a PPL information service without changing existing broadcasting systems through interworking between a user terminal, and a supplementary information service providing server and a content server for providing supplementary information. Accordingly, it is expected that encroachment on the data market related to a new group of DMB users can be avoided and a new data market can also be created.

DESCRIPTION OF DRAWINGS

The following drawings attached to the present specification illustrate preferred embodiments of the present invention and function to further understanding of the technical spirit of the present invention in conjunction with the following detailed description of the present invention. It is not to be misconstrued that the present invention is restricted only to what is shown in the drawings.

BEST MODE

[Mode for Invention]

Preferred embodiments of the present invention are described in detail with reference to the accompanying drawings below.

Figure 1:
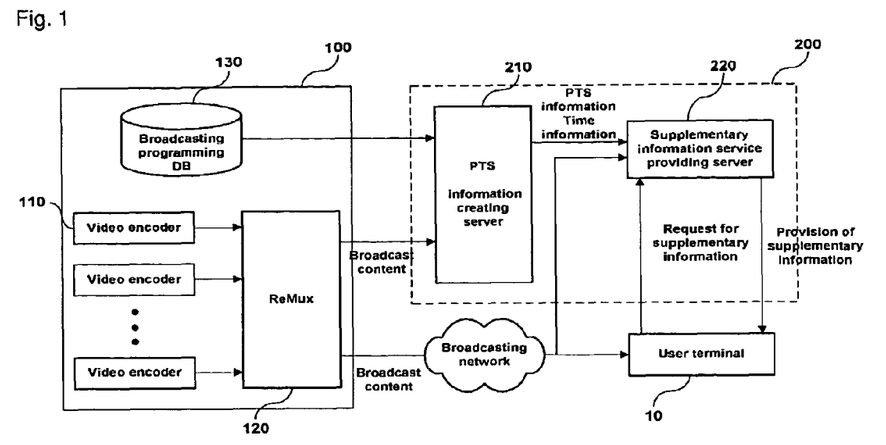
FIG. 1 is a network configuration diagram illustrating a system for providing a supplementary information service related to broadcast content according to an embodiment of the present invention.
Figure 2:
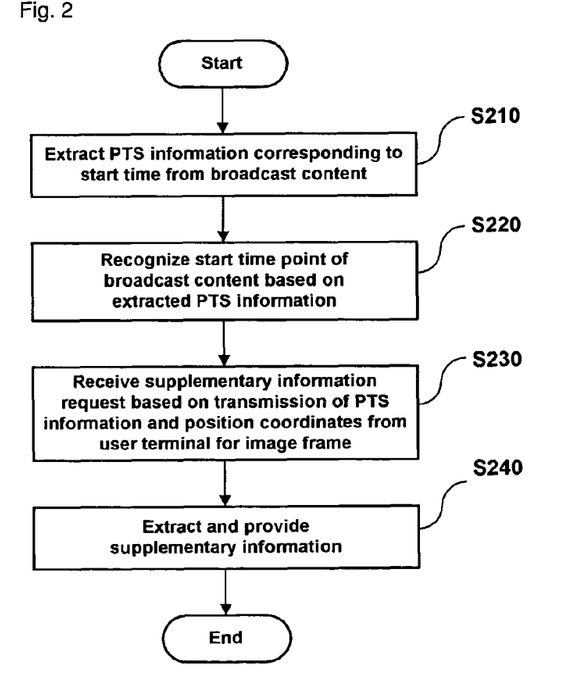
FIG. 2 is a flowchart illustrating a method of providing supplementary information related to broadcast content according to an embodiment of the present invention.

Referring to FIGS. 1 and 2, a system and method for providing a supplementary information service related to broadcast content, which precisely match broadcast content-based supplementary information to corresponding broadcast content, which varies in real time, and then provide it to users, according to an aspect of the present invention, will be described.

FIG. 1 is a network configuration diagram illustrating a system for providing a supplementary information service related to broadcast content according to an embodiment of the present invention.

As shown in FIG. 1, the system includes a broadcasting system 100, a supplementary information service providing system 200, and a user terminal 10.

The broadcasting system 100 transmits various types of broadcast content through a broadcasting infrastructure, and stores programming information about the transmitted broadcast content.

The supplementary information service providing system 200 includes a Presentation Time Stamp (PTS) information creating server 210 for extracting PTS information about the start time of the transmitted broadcast content, and a supplementary information service providing server 220 for storing various pieces of supplementary information corresponding to the broadcast content, extracting corresponding supplementary information, and providing it to the user terminal 10 at the request of the user terminal 10. The user terminal 10 receives broadcast content from the broadcasting system 100, requests supplementary information related to corresponding broadcast content from the supplementary information service providing server 220, and receives the requested supplementary information through a communication infrastructure.

The broadcasting system 100 includes a plurality of video encoders 110, including an H.264 encoder, an MPEG2 encoder, an MPEG4 encoder, etc., a ReMux 120 for integrating broadcast content provided from the video encoders 100 and transmitting the integrated broadcast content through the broadcasting infrastructure, and a broadcast programming database 130 for storing programming information about various types of broadcast content transmitted through the ReMux 120. Here, the term 'broadcast content' refers to Audio/Video (A/V) content. Furthermore, the broadcasting infrastructure corresponds to Digital Television (DTV) received via terrestrial waves, satellite TV and DMB received via satellites, terrestrial DMB, etc.

The user terminal 10 is a broadcasting and communication convergence terminal device capable of processing and providing received broadcasting signals and transmitting and receiving data over a communication network. The user terminal 10 can be implemented using any one of various types of terminal devices, such as a mobile communication terminal, a PDA, and a notebook.

The PTS information creating server 210 receives various types of broadcast content and programming information about broadcast content from the broadcasting system 100, identifies information about the start time of specific broadcast content, extracts PTS information corresponding to the start time of the corresponding broadcast content from the transmitted broadcast content, and transmits the extracted PTS information to the supplementary information service providing server 220 together with absolute time information. Preferably, the PTS information creating server 210 extracts PTS information corresponding to the start time from a Moving Picture Experts Group Transport Stream (MPEG-TS) included in the transmitted broadcast content, and transmits the extracted PTS information to the supplementary information service providing server 220.

The supplementary information service providing server 220 stores various pieces of supplementary information corresponding to the broadcast content, receives information about the start time of the broadcast content and PTS information corresponding to the start time information from the PTS information creating server 210, associates a specific screen of the broadcast content with corresponding supplementary information, and provides corresponding supplementary information through a communication infrastructure at the request of the user terminal 10.

That is, the supplementary information service providing server 220 identifies the start time of the broadcast content from the MPEG-TS included in the broadcast content transmitted on the basis of the PTS information provided from the PTS information creating server 210, calculates the elapsed time for the specific screen based on the PTS information about an image frame of the specific screen, which is provided from the user terminal 10 at the request of the PTS information corresponding to the information about the start time of the broadcast content and supplementary information, extracts supplementary information corresponding to the specific screen requested by the user terminal 10, and provides the extracted supplementary information to the user terminal 10 through the communication infrastructure. Meanwhile, when supplementary information is requested by the user terminal 10, coordinate information, as well as PTS information about the image frame of a specific screen in broadcast content, may be provided. The supplementary information service providing server 220, having received the information, extracts corresponding supplementary information using the elapsed time and the coordinate information (X and Y coordinates on a specific screen image) as parameters.

The user terminal 10 corresponds to a broadcasting and communication convergence terminal capable of receiving broadcast content and supplementary communication information at the same time, and is provided with desired supplementary information through a communication infrastructure by transmitting PTS information and coordinate information about the image frame of a desired specific screen to the supplementary information service providing server 220, as described above, when requesting the supplementary information. Here, the communication infrastructure corresponds to a cellular communication system, a PCS system, a wireless LAN, a W-CDMA system, the portable Internet or the like.

Referring to FIG. 2, a method of providing supplementary information related to broadcast content according to an embodiment of the present invention will be described below. FIG. 2 is a flowchart illustrating the method of providing supplementary information related to broadcast content according to the embodiment of the present invention.

The PTS information creating server 210 receives information about the start time of broadcast content from the broadcasting system 100, and extracts PTS information corresponding to the start time from the broadcast content transmitted from the broadcasting system at step S210. Preferably, the PTS information creating server 210 extracts PTS information corresponding to the start time from an MPEG-TS included in the transmitted broadcast content.

The supplementary information service providing server 220 identifies the start time of the transmitted broadcast content based on the PTS information corresponding to the start time at step S220. Preferably, the supplementary information service providing server 220 identifies the start time of the broadcast content from the MPEG-TS included in the transmitted broadcast content on the basis of the PTS information corresponding to the start time. Thereafter, the user terminal 10, having received the transmitted broadcast content, requests supplementary information by transmitting PTS information and coordinate information about the image frame of a specific screen at step S230.

The supplementary information service providing server 220 then calculates the elapsed time for the specific screen based on the PTS information corresponding to the information about the start time of the broadcast content and the PTS information about the image frame of the specific screen, which is provided from the user terminal 10.

Thereafter, the supplementary information service providing server 220 extracts supplementary information corresponding to the specific screen using the elapsed time and the coordinate information as parameters, and provides the extracted supplementary information to the user terminal 10 at step S240. Referring to FIGS. 3 to 6, a supplementary information service providing system for efficiently implementing a bidirectional data broadcasting service, which is provided over a broadcasting network, over a communication network including a mobile communication network, according to another aspect of the present invention will be described below.

Figure 3:
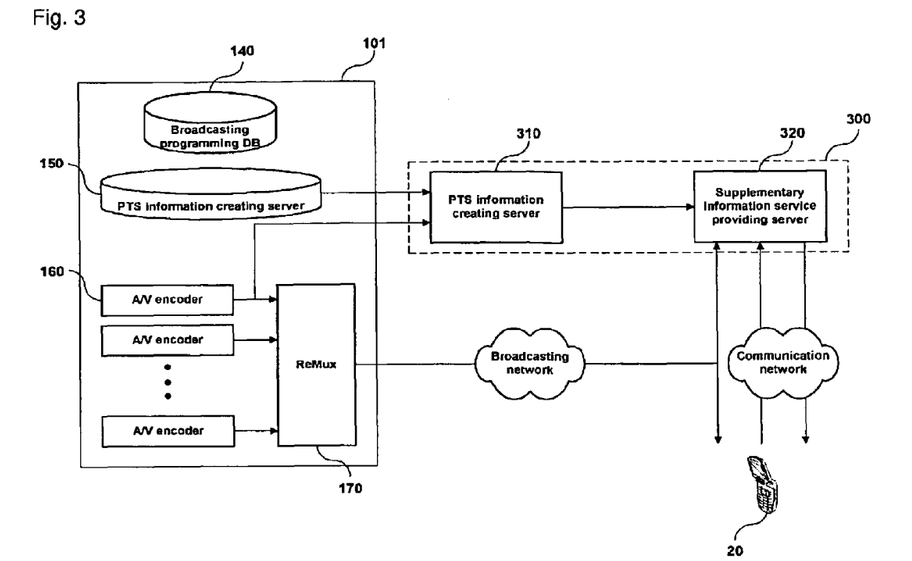
FIG. 3 is a network configuration diagram illustrating a system for providing a supplementary information service related to broadcast content according to another embodiment of the present invention.

FIG. 3 is a network configuration diagram illustrating a system for providing a supplementary information service related to broadcast content according to another embodiment of the present invention. The network, illustrated in FIG. 3, includes a broadcasting system 101, a supplementary information service providing system 300, and a user terminal 20.

The broadcasting system 101 provides a broadcasting service by transmitting broadcast content, such as news and dramas, over a broadcasting network, and transmits broadcast programming information and bidirectional data broadcasting supplementary information corresponding to at least one piece of broadcast content based on a broadcast programming database (DB) 140 and a data broadcasting schedule/subject matter DB 150.

The supplementary information service providing system 300 includes a PTS information creating server 310 and a supplementary information service providing server 320.

The PTS information creating server 310 extracts PTS information for playing broadcast content received from the user terminal 20, and forms CTS information for synchronizing the extracted PTS information with bidirectional data broadcasting supplementary information received from the broadcasting system 101. The PTS information creating server 310 additionally forms bidirectional data broadcasting supplementary information including CTS information, and transmits it together with the PTS information. The supplementary information service providing server 320 performs the interworking of a bidirectional data broadcasting service through the reception of broadcast programming information, and manages the received PTS information, bidirectional data broadcasting supplementary information, including CTS information, and broadcast programming information so that they are matched to each. Furthermore, the supplementary information service providing server 320 reads bidirectional data broadcasting supplementary information, including previously stored CTS information, based on PTS information included in a request for the provision of service from a user terminal through a communication network, extracts corresponding bidirectional data broadcasting supplementary information, and transmits it to the user terminal 20.

The user terminal 20 is a broadcasting and communication convergence terminal device capable of processing and providing received broadcasting signals and transmitting and receiving data over a communication network. The user terminal 20 can be implemented using any one of various types of terminal devices, such as a mobile communication terminal, a PDA and a notebook. According to an embodiment of the present invention, the PTS information creating server 310 identifies a communication environment, such as the amount of information received from the broadcasting system 101 and the amount of information transmitted to the supplementary information service providing server 320, and determines whether to form CTS information and bidirectional data broadcasting supplementary information, including the CTS information, based on the results of the identification.

Therefore, if, as a result of the determination, it is determined that CTS information and bidirectional data broadcasting supplementary information including the CTS information are to be created, the PTS information creating server 310 transmits PTS information to the supplementary information service providing server 320 and directs the supplementary information service providing server 320 to create CTS information and bidirectional data broadcasting supplementary information, including the CTS information.

Meanwhile, the supplementary information service providing server 320 can be provided with broadcast programming information by the broadcasting system 101 without interworking with broadcast programming information or can be provided with broadcast programming information provided through the PTS information creating server 310 by monitoring PSI/SI information, which is broadcast over a broadcasting network.

Furthermore, the supplementary information service providing server 320 converts bidirectional data broadcasting supplementary information, including CTS information, into a BIFS format, which is the data broadcasting standard, and stores and manages the converted bidirectional data broadcasting supplementary information.

Figure 4:
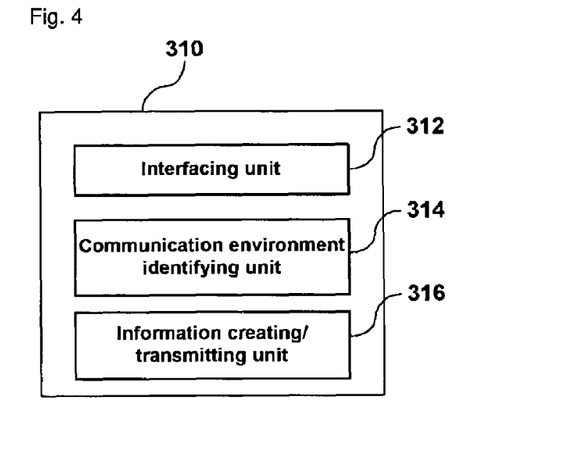
FIG. 4 is a configuration diagram showing the Presentation Time Stamp (PTS) information creating server of FIG. 3.

FIG. 4 is a configuration diagram showing the PTS information creating server 310 of FIG. 3.

As shown in FIG. 4, the PTS information creating server 310 according to an embodiment of the present invention includes an interfacing unit 312, a communication environment identification unit 314, and an information creating/transmitting unit 316.

The interfacing unit 312 performs an operation of interworking with a broadcasting network and the supplementary information service providing server. The communication environment identifying unit 314 identifies a communication environment for at least one of the amount of information received over a broadcasting network and the amount of information transmitted to the supplementary information service providing server 320. The information creating/transmitting unit 316 determines whether to form bidirectional data broadcasting supplementary information, including CTS information, based on the results of the identification of the communication environment, and then transmits at least one of the bidirectional data broadcasting supplementary information, including the CTS information, and the PTS information to the supplementary information service providing server 320.

Figure 5:
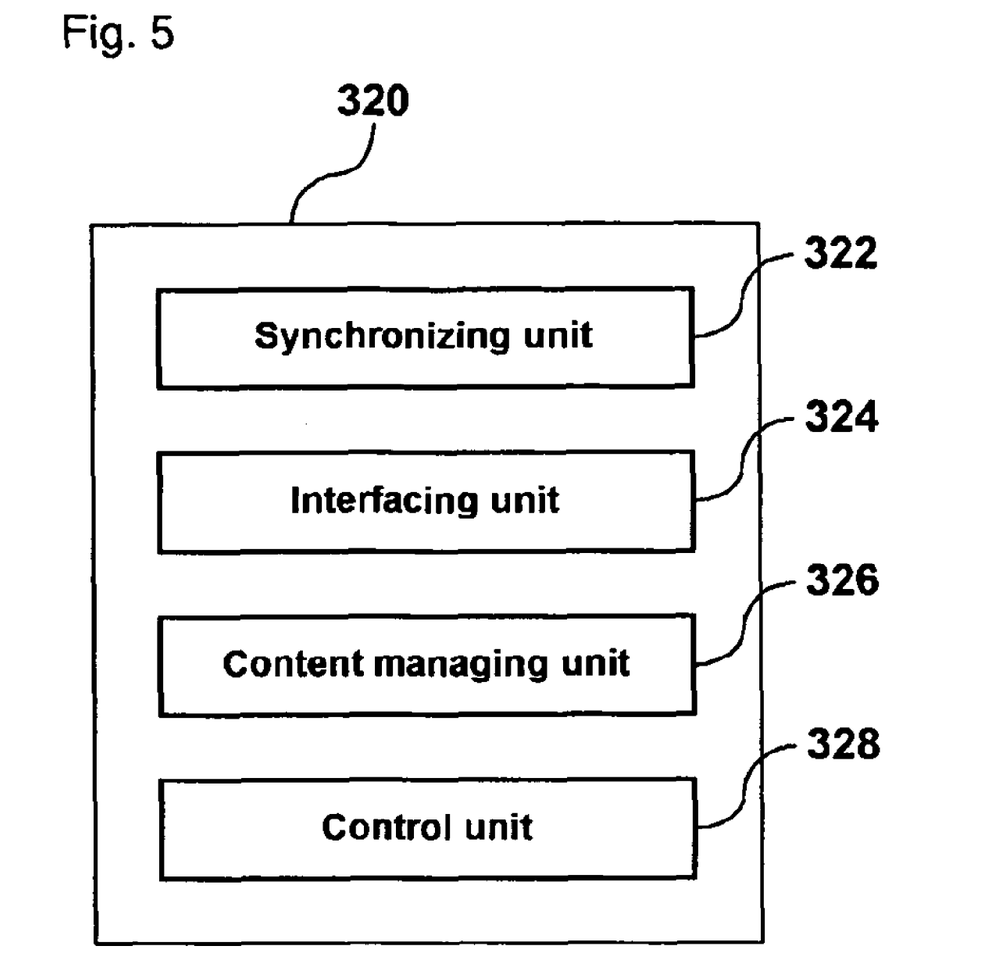
FIG. 5 is a configuration diagram showing the supplementary information service providing server of FIG. 3.

FIG. 5 is a configuration diagram showing the supplementary information service providing server 320 of FIG. 3.

As shown in FIG. 5, the supplementary information service providing server 320 according to an embodiment of the present invention includes a synchronizing unit 322, an interfacing unit 324, a content managing unit 326, and a control unit 328.

The synchronizing unit 322 synchronizes broadcast content with bidirectional data broadcasting supplementary information based on time interworking information, PTS information and CTS information about broadcast content transmitted from the broadcasting system 101. The interfacing unit 324 performs an operation of interworking with at least one of a broadcasting network and a communication network. The content managing unit 326 forms CTS information when bidirectional data broadcasting supplementary information, including CTS information, is not provided from the PTS information creating server 310, or converts bidirectional data broadcasting supplementary information, including the CTS information, into a BIFS format and stores the converted bidirectional data broadcasting supplementary information. The control unit 328 executes a series of processes for transferring bidirectional data broadcasting supplementary information, including CTS information, to the user terminal 20 that requested a service via a protocol for exchanging messages with the user terminal 20 over a communication network.

The operational procedure of the supplementary information service providing system according to the present invention is described in detail below with reference to the accompanying drawings.

Figure 6:
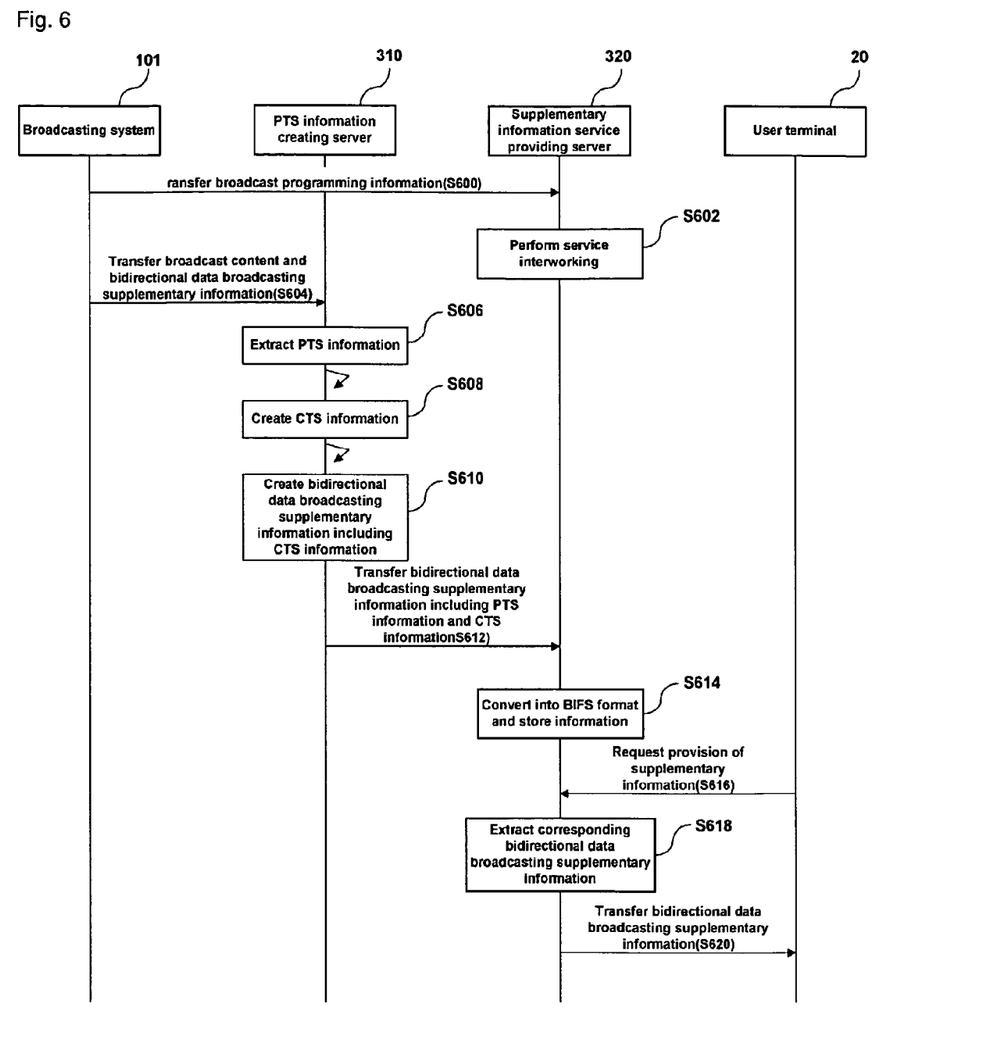
FIG. 6 is a flowchart illustrating the operational procedure of the system for providing a supplementary information service related to broadcast content, illustrated in FIG. 3.

FIG. 6 is a flowchart illustrating the operational procedure of the supplementary information service providing system illustrated in FIG. 3. As shown in FIG. 6 only as an example, a method of providing a communication network-based bidirectional data broadcasting service is performed in such a way that the broadcasting system 101 transmits broadcast programming information, including content related to the broadcast content of each broadcast channel, channel-based broadcast content, and bidirectional data broadcasting supplementary information corresponding to the broadcast content over a broadcasting network, and then the PTS information creating server 310 and the supplementary information service providing server 320 receive specific information over a broadcasting network at steps S600 to S604.

In this case, the supplementary information service providing server 320 can be provided with the broadcast programming information by monitoring PSI/SI broadcast over a broadcasting network, or can be provided with broadcast programming information provided through the PTS information creating server 310.

Thereafter, the PTS information creating server 310 extracts PTS information, which provides a reference for playing broadcast content in the user terminal 20, based on information related to received broadcast content at step S606, and then forms CTS information, which provides a reference for temporally synchronizing the PTS information with the bidirectional data broadcasting supplementary information at step S608. In this case, the CTS information functions to synchronize a broadcast program with supplementary information in consideration of delay caused by a network and equipment with reference to PTS included in a broadcast program. For example, CTS=PTS+delay offset (the offset value may be set to a plus or minus value).

The PTS information creating server 310 additionally forms bidirectional data broadcasting supplementary information, including CTS information, based on the CTS information, formed at step S608, at step S610, and then transmits the formed information to the supplementary information service providing server 320 over a broadcasting network at step S612.

Accordingly, the supplementary information service providing server 320 manages and stores the PTS information received over a broadcasting network, the bidirectional data broadcasting supplementary information including the CTS information, and the broadcast programming information so that they are matched to each other at step S614. When a request for the provision of specific supplementary information is received from the user terminal through which a broadcast is viewed, the supplementary information service providing server 320 identifies PTS information included in the request at step S616, and extracts corresponding bidirectional data broadcasting supplementary information through a process of specifying corresponding CTS information at step S618.

Thereafter, the supplementary information service providing server 320 transmits the extracted bidirectional data broadcasting supplementary information to the user terminal 20 that requested service at step S620.

Referring to FIGS. 7 to 10, a system and method for providing a supplementary information service related to broadcast content according to still another aspect of the present invention is described below. The supplementary information service providing method according to still another embodiment of the present invention, in which a user can request information about, for example, a person or a product displayed on a broadcast screen while watching television using a user terminal over the wireless Internet, that is, a bidirectional communication channel, is called a GUIP service.

Figure 7:
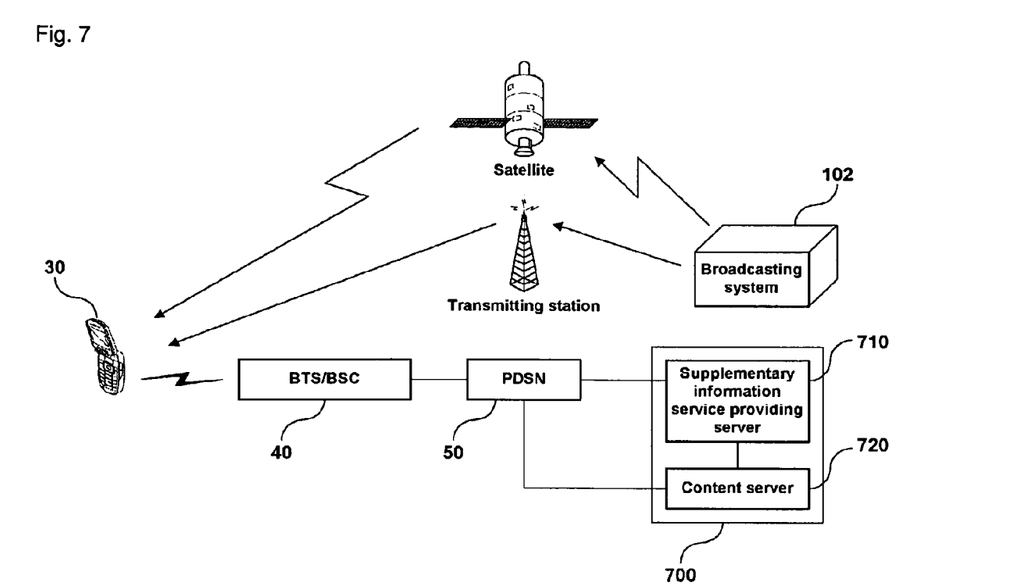
FIG. 7 is a network configuration diagram showing a system for providing a supplementary information service related to broadcast content according to still another embodiment of the present invention.
Figure 8:
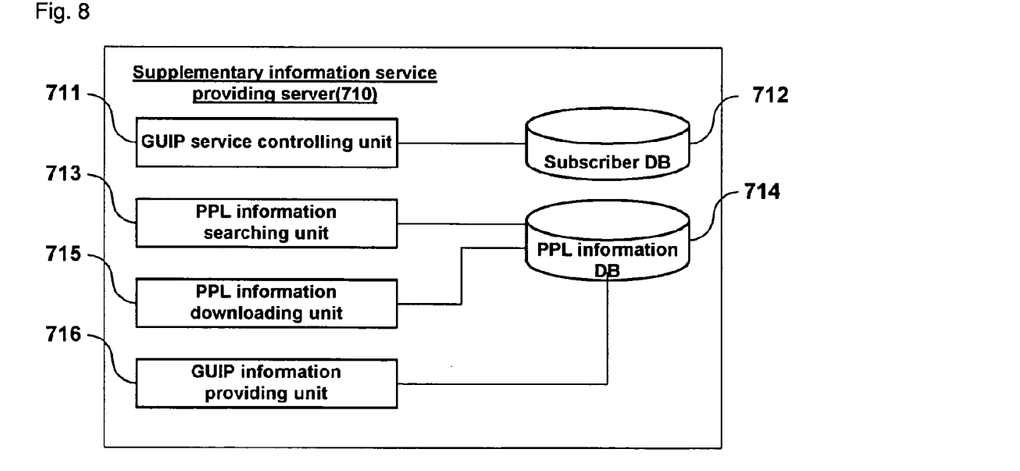
FIG. 8 is a configuration diagram showing a server for providing a supplementary information service related to broadcast content according to still another embodiment of the present invention.

FIG. 7 is a network configuration diagram showing a system 700 for providing a supplementary information service related to broadcast content according to still another embodiment of the present invention. FIG. 8 is a configuration diagram showing a supplementary information service providing server according to still another embodiment of the present invention.

As shown in FIG. 7, the system 700 for providing a supplementary information service related to broadcast content 700 according to the present invention includes a supplementary information service providing server 710 and a content server 720, to which a user terminal 30, which receives DMB content from a broadcasting system 102 and plays received DMB content, can gain access through the bidirectional data service path of a mobile communication network.

The user terminal 30 is a terminal that receives satellite DMB content via a satellite from the broadcasting system 102 or receives terrestrial DMB content via a ground transmitting station. The user terminal 30 can access the supplementary information service providing server 710 and the content server 720 via a Base Transceiver Station/a Base Station Controller (BTS/BSC) 40 and a Packet Data Serving Node (PDSN) 50, that is, the data service path of a mobile communication network.

The supplementary information service providing server 710 provides information about the types of supplementary information available for each object, which is displayed on a DMB screen. Hereinafter, information provided by the supplementary information service providing server 710 is referred to as 'PPL information'.

That is, the supplementary information service providing server 710 is a server for enabling a user to select a specific object on a broadcast screen through interworking with the user terminal 30 that received PPL information and supporting the provision of supplementary information content for a selected object to a user. For example, when a user selects a specific GUIP start key while watching television, the supplementary information service providing server 710 transmits information about the contours of objects (for example: a singer, clothes worn by the singer, etc.), which are displayed on a broadcast screen after the corresponding time point, information about the types of information (for example: the profile of a singer, the albums of the singer, the words of each song sung by the singer, information about clothes worn by the singer, etc.) available for each object, and information about the download address (URL) of corresponding information, that is, content. Meanwhile, in this case, the contour information is information that enables a user to select an object. When the contour information is synchronized with a broadcast screen, the user terminal 30 can display the contour of an object selected when the user selects a key. Thus, the contour information is provided as guide information that enables a user to select a specific object.

If the user terminal 30 is equipped with a touch screen, additional guide information for selecting an object does not need to be provided. In this case, the user terminal 30 can be directly provided with information about an object at a selected point by transmitting information about the coordinates of the point, selected by a user, to the supplementary information service providing server 710.

Therefore, in this case, the supplementary information service providing server 710 does not need to provide the overall PPL information about the subsequent broadcast in advance, but it is sufficient for the supplementary information service providing server 710 to provide information about the types of supplementary information available for an object at a specific point when the specific point is selected, and content URL information (hereinafter referred to as "GUIP information").

As described above, when the user terminal 30 selects an object (a person, a product, or the like) displayed on a broadcast screen while watching television, the supplementary information service providing server 710 of the present invention enables information, which can be provided for the selected object, to be checked, and provides a URL so that the content of selected information can be downloaded from the content server 720. The construction for this procedure is shown in FIG. 8.

The supplementary information service providing server 710 of the present invention, as illustrated in FIG. 8, includes a GUIP service controlling unit 711, a PPL information searching unit 713, a PPL information downloading unit 715, and a GUIP information providing unit 716.

The GUIP service controlling unit 711 receives a GUIP start request message, including the channel information of a broadcast currently being watched, and program information from the user terminal 30, and transmits the GUIP start acknowledgement message, including information included in the received GUIP start request message, to the user terminal 30 so that information can be checked by a user or terminal.

The GUIP start request message is a service request message that is automatically created and transmitted from the user terminal 30 when a user selects a GUIP start key using the user terminal 30. The GUIP start request message may include an MIN number, PTS information, provided to provide notification of current broadcasting time, GUIP service-type information, information about the type of terminal (a notebook, a mobile phone, etc.), broadcast channel information, broadcast program information, etc.

The PTS is a time stamp included in a DMB data packet. Since a corresponding broadcast program can be searched for a screen at a time point requested by a user using the PTS of a packet header, the supplementary information service providing server 710 provides PPL information or GUIP information at or after the corresponding point.

The GUIP service type information is information for identifying a download method. Methods by which the supplementary information service providing server 710 downloads PPL information in the present invention include full pre-download, partitioned pre-download, and on-demand methods.

Here, the full pre-download method and the partitioned pre-download method are methods of downloading PPL information, including the contour information of a plurality of objects for a broadcast after a corresponding broadcast program, information about the types of supplementary information, and a content URL when a PPL information request message is received. The full pre-download method is a method of downloading PPL information about the entire corresponding broadcast program at once, and the partitioned pre-download method is a method of partitioning PPL information into appropriately sized pieces of information and then downloading the partitioned PPL information at specific intervals periodically and sequentially in order to distribute a communication network traffic load. Furthermore, the on-demand method is a method applied to the user terminal 30 equipped with a touch screen, and is a method of downloading only GUIP information, including information about the types of supplementary information for a corresponding object and a content URL, when a GUIP information request message, including coordinates of a selected specific point, is received.

The GUIP service type may be previously set in the user terminal 30, may be selected at the time of pressing a GUIP start key, or may be stored in the subscriber database 712 of the supplementary information service providing server 710.

Meanwhile, if a GUIP service proposed in the present invention is provided only to service subscribers, the GUIP service controlling unit 711 can determine whether information about a corresponding subscriber exists in the subscriber database 712 when receiving a GUIP start request message, perform subscriber authentication, and then return a GUIP start acknowledgement message including the results of the authentication.

Thereafter, when a PPL information request message, including the channel information and program information of a broadcast, is received from the user terminal 30, the PPL information searching unit 713 searches the PPL information database 714 for PPL information about a corresponding broadcast program based on information including the PPL information request message, and provides the user terminal 30 with URL information based on which corresponding PPL information can be downloaded.

In this case, since PPL information about a corresponding broadcast after a time point requested by the user terminal 30 must be searched for, the PPL information searching unit 713 searches for PPL information about portions that will be watched subsequently based on PTS information indicating the playback time of a broadcast program included in the PPL information request message received from the user terminal 30.

The PPL information database 714 stores guide information for selecting an object displayed on a broadcast screen, and PPL information, including the types of supplementary information available for each object, and content URL information, based on which each piece of supplementary information content can be downloaded, for each broadcast program.

For example, in the case of a music broadcast program, an object of PPL information may include a singer displayed on a screen. The types of supplementary information available for a corresponding singer may include the profile information of a corresponding singer, the album information of a corresponding singer, a song that is being sung, and so on. Furthermore, when a user selects a song, a corresponding sound source content can be provided as supplementary information content. In this case, the download URL information of corresponding sound source content is included in the PPL information.

Here, the guide information is information that enables a user to select one from among objects displayed on a broadcast screen. As described above, the guide information may include contour information for displaying the contour of an object, and may be designed in various ways, other than the contour information. Furthermore, this guide information must indicate guide information, such as the contour of a corresponding object, when a key is pressed so that it can be synchronized with broadcasting data in the user terminal 30, and thus a user can select a desired object through a key input while watching television.

In the case where the PPL information searching unit 713 provides URL information that enables PPL information, searched by the user terminal 100, to be downloaded, the PPL information downloading unit 715 downloads corresponding PPL information when the user terminal 30 accesses a corresponding URL.

As described above, the download method of PPL information includes the full pre-download method and the partitioned pre-download method. Therefore, when information about any one of the full pre-download method and the partitioned pre-download method, that is, the download methods of the PPL information, is included in the PPL information request message, or corresponding information is stored in the subscriber database 712, the PPL information downloading unit 715 downloads all of the PPL information at one time in the case of the full pre-download method, or partitions PPL information into appropriately sized pieces of information and sequentially downloads respective pieces of partitioned PPL information in the case of the partitioned pre-download method, based on the information.

The GUIP information providing unit 716 is a construction for providing a service to the user terminal 30 equipped with a touch screen. When the user selects a specific point of the broadcast screen, and thus a GUIP information request message, including the channel information and program information of a broadcast, which is being watched, the coordinate information of the selected point, and PTS information, is received from the user terminal 30, the GUIP information providing unit 716 identifies an object at a point selected by the user with reference to the PPL information database 714 based on information included in the GUIP information request message. Thereafter, the GUIP information providing unit 716 transmits the GUIP information acknowledgement message, including the type of supplementary information that can be provided to a corresponding object and content URL information, based on which each piece of supplementary information content can be downloaded, to the user terminal 30.

In this case, the PPL information database 714 must further store the coordinate information of an object that is displayed through a broadcast screen, more precisely, information about the range of coordinates of a screen region occupied by the object.

Meanwhile, the PPL information downloading unit 715 provides PPL information about a broadcast, occurring after a time point that is requested by a user, and guide information that allows an object to be selected is included in corresponding PPL information. Accordingly, the user terminal 30 can download PPL information, identify an object selected by a user, and be provided with corresponding supplementary information content.

In contrast, the GUIP information providing unit 716 receives coordinate information selected by a user in real time, identifies an object corresponding to corresponding coordinates, and provides only corresponding information.

Meanwhile, in FIG. 8, the supplementary information service providing server 710 is configured to deal with both the case where PPL information is downloaded and an object is identified in the user terminal 30 and the case where, when the user terminal 30 transmits coordinates, the supplementary information service providing server 710 identifies a corresponding object and provides only GUIP information. However, the GUIP information providing unit 716 may be omitted if only the former service is provided, while the PPL information searching unit 713 and the PPL information downloading unit 715 may be omitted if only the latter service is provided.

The detailed method and service procedure of interworking between the supplementary information service providing server 710 and the user terminal 30, which have been described with reference to FIGS. 7 and 8, are sequentially described below with reference to FIGS. 9 and 10.

Figure 9:
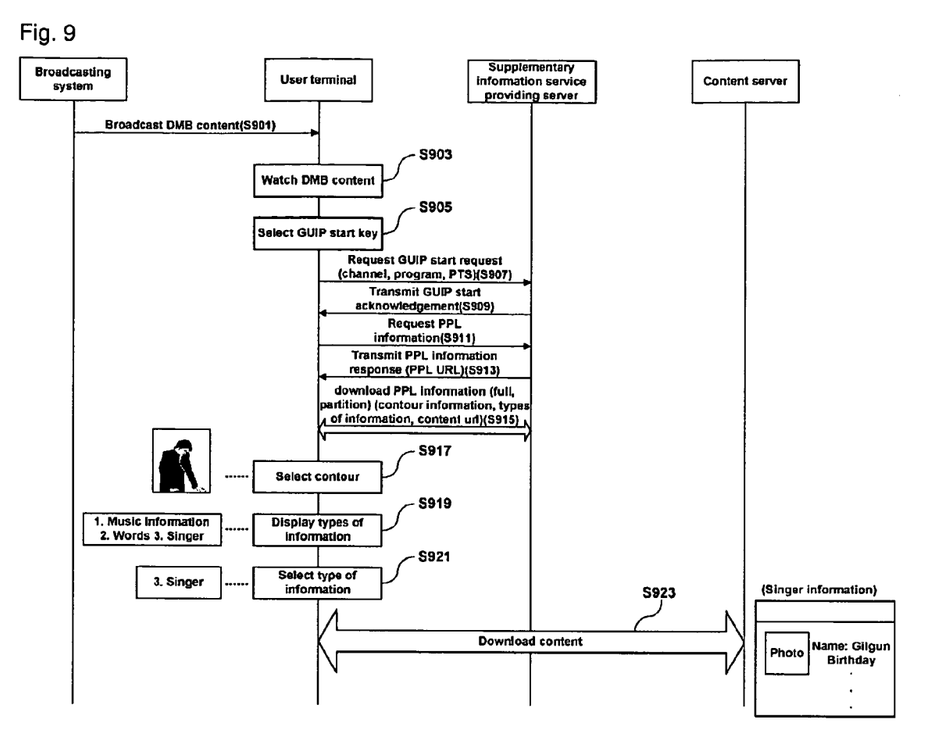
FIG. 9 is a flowchart sequentially illustrating a method of providing a supplementary information service related to broadcast content according to still another embodiment of the present invention.

FIG. 9 is a flowchart sequentially illustrating a GUIP service method according to an embodiment of the present invention, and shows a procedure of downloading PPL information.

As shown in the drawing, the user terminal 30 receives broadcast DMB content from the broadcasting system 102 and plays the received DBM content at step S901, so that a user can watch DMB content at step S903. When the user selects the GUIP start key while watching the DMB content at step S905, the user terminal 30 transmits a GUIP start request message to the supplementary information service providing server 710 at step S907. In this case, the GUIP start request message must include channel information, broadcast program information, and PTS information, and fundamentally includes the MIN number of a terminal and information about the type of terminal.

The supplementary information service providing server 710 transmits a GUIP start acknowledgement message to the user terminal 30, with information, included in the GUIP start request message, included in the GUIP start acknowledgement message in order for a terminal or a subscriber to check the information at step S909. In this case, the function of the GUIP start request message and the function of the GUIP start acknowledgement message may be included in a subsequent PPL information request message and a subsequent PPL information acknowledgement message.

The user terminal 30 transmits a PPL information request message, including a channel, a program, PTS information, etc., to the supplementary information service providing server 710 at step S911. In response thereto, the supplementary information service providing server 710 searches for PPL information about a broadcast, which is being watched by a corresponding user, based on the corresponding channel, program, and PTS information, and transmits URL information, which enables the PPL information to be downloaded, to the user terminal 30 with the URL information included in the PPL information acknowledgement message at step S913.

The user terminal 30, having received the PPL information acknowledgement message, obtains an automatic or user confirmation, accesses a corresponding URL, and downloads PPL information at step S915. In this case, the PPL information includes guide information for selecting an object, such as contour information, information about the type of supplementary information available for each object, and URL information about each piece of supplementary information content.

Meanwhile, although the procedure of downloading PPL information (S915) has been illustrated as a single step in the drawing, it is possible to download partitioned PPL information at specific intervals several times in the case of the partitioned pre-download method.

The user terminal 30, having downloaded the PPL information, synchronizes the PPL information with DMB data, thereby supporting the user's selection of an object and supplementary information. When the user selects the contour of a specific object while watching television at step S917, the user terminal 30 displays the types of supplementary information for a corresponding object at step S919. When the type of supplementary information is selected at step S921, the user terminal 30 accesses a corresponding supplementary information content URL and downloads content requested by the user at step S923.

Figure 10:
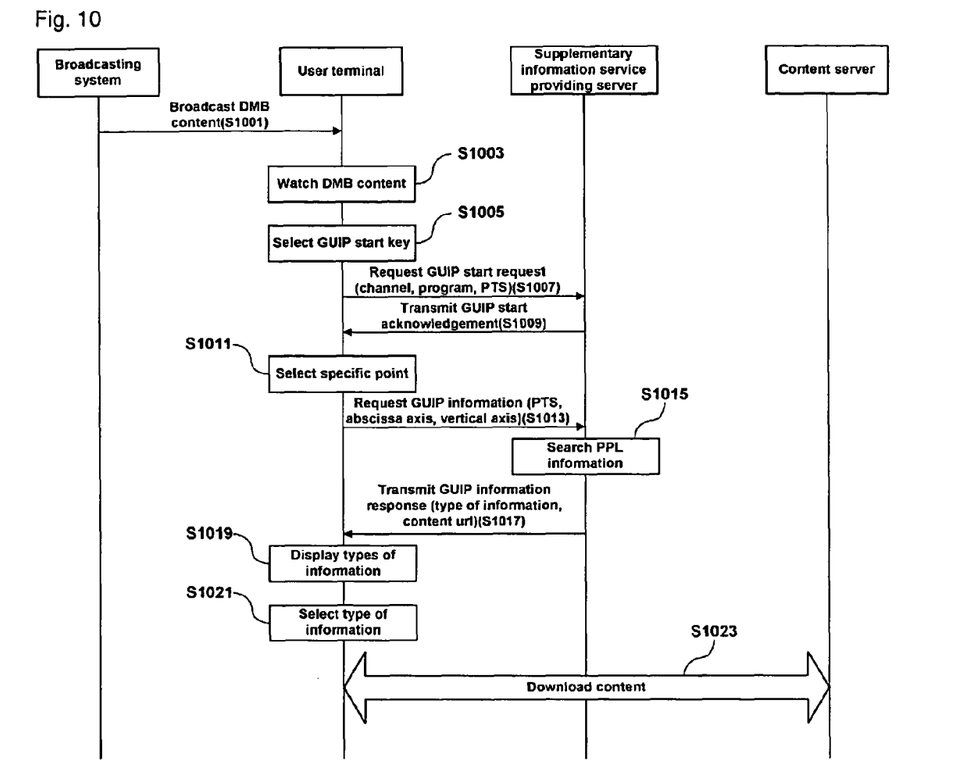
FIG. 10 is a flowchart sequentially illustrating a method of providing a supplementary information service related to broadcast content according to a further embodiment of the present invention.

FIG. 10 shows an embodiment of transmitting the coordinate information of an object and downloading GUIP information.

As shown in the drawing, the user terminal 30 receives broadcast DMB content from the broadcasting system 102 at step S1001 and plays corresponding broadcast content so that the user can view and hear the content at step S1003. When the user selects a GUIP start key at step S1005, the user terminal 30 automatically accesses the supplementary information service providing server 710 and transmits a GUIP start request message at step S1007. In this case, information, such as a channel, a program, PTS, a terminal MIN, and the type of terminal, is automatically inserted into the GUIP start request message.

When a GUIP start acknowledgement message is received from the supplementary information service providing server 710 at step S1009, the user terminal 30 activates a function of enabling the user to select an object from a broadcast screen.

In general, even if a user presses a specific point on the screen of a touch screen, no operation may be performed, or a specific DMB function may be performed. Accordingly, in order to provide the service of the present invention, when the GUIP start key is selected, the user terminal 30 must activate a corresponding service function, and must send a GUIP information request message, including corresponding coordinate information (in the abscissa and ordinate axes) and PTS information, to the supplementary information service providing server 710 at step S1013 when the user subsequently selects a specific point of the screen at step S1011.

In this case, a channel and program information must be included in the GUIP information request message. In some cases, the service of the present invention may be implemented so that corresponding information is not sent again when the information is information that has been sent through the GUIP start request message.

The supplementary information service providing server 710 identifies the broadcast screen that was watched by the user at a corresponding point and an object that corresponds to coordinates on the screen, which was selected by the user, based on the coordinate information and the PTS information included in the GUIP information request message, and then searches for corresponding PPL information at step S1015.

In the present embodiment, it is sufficient to provide only information about the type of supplementary information available for the object, selected by the user, and a content URL, which belong to the searched PPL information. Accordingly, the supplementary information service providing server 710 does not provide a URL based on which corresponding information can be downloaded separately, but returns a GUIP information acknowledgement message with GUIP information (the type of supplementary information and content URL) included therein at step S1017.

In response thereto, the user terminal 30 displays information about the types of supplementary information, which belongs to the received GUIP information, on a screen at step S1019. When the user selects specific supplementary information at step S1021, the user terminal 30 accesses a corresponding content URL and downloads content at step S1023.

[Industrial Applicability]

The system and method for providing a supplementary information service related to broadcast content according to the present invention precisely match supplementary information based on each frame of broadcast content, which varies in real time, to the frame, and then provide the supplementary information, thereby improving the service satisfaction of a user.

Furthermore, the present invention is intended to efficiently implement a bidirectional data broadcasting service, which is provided over a broadcasting network, over a communication network including a mobile communication network, and thus the present invention is industrially applicable because it has satisfactory marketability and sales potential and can be implemented in practice.

Furthermore, according to the present invention, there are advantages in that various pieces of information can be provided through the convergence of a DMB service and a PPL information service without changing the existing broadcasting systems through interworking between a user terminal, and a supplementary information service providing server and a content server for providing supplementary information, with the result that it is expected that encroachment on the data market related to a new group of DMB users can be avoided, and a new data market can be created.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A system for providing a supplementary information service related to broadcast content being broadcasted to a user terminal, the system comprising:
   a Time Information Creating Server for identifying start time information with respect to a start time of the broadcast content; and
   a Supplementary Information Service Providing Server for receiving the start time information of the broadcast content from the Time Information Creating Server, receiving a supplemental information request, calculating an elapsed time for a specific scene based on the start time information, and providing the user terminal with supplementary information corresponding to the specific scene based on the elapsed time, through a communication network,
   wherein the Supplementary Information Service Providing Server receives a supplementary information request and scene time information of the specific scene from the user terminal, and calculates the elapsed time for the specific scene based on the start time information and the scene time information of the specific scene, and
   the Supplementary Information Service Providing Server further receives coordinate information from the user terminal and provides the user terminal with the supplementary information corresponding to both of the specific scene and the coordinate information.

2. The system as set forth in claim 1, wherein the start time information includes first presentation time stamp (PTS) information corresponding to the start time of the broadcast content.

3. The system as set forth in claim 2, wherein the scene time information of the specific scene includes second PTS information of the specific scene, and wherein the Supplementary Information Service Providing Server calculates the elapsed time based on the first PTS information corresponding to the start time and the second PTS information of the specific scene and extracts the supplementary information, the supplementary information being to be provided to the user terminal, corresponding to the elapsed time.

4. The system as set forth in claim 2, wherein the Time Information Creating Server extracts the first PTS information from the broadcast content.

5. The system as set forth in claim 3, wherein the start time information further includes absolute time information, and wherein the Supplementary Information Service Providing Server extracts the supplementary information, the supplementary information being to be provided to the user terminal, based on the elapsed time and the absolute time information.

6. The system as set forth in claim 3, wherein the second PTS information is information about an image frame of the specific scene.

7. The system as set forth in claim 4, wherein the first PTS information is extracted from a Moving Picture Experts Group Transport Stream (MPEG-TS) included in the broadcast content.

8. The system as set forth in claim 1, wherein the Supplementary Information Service Providing Server provides the user terminal with uniform resource locator (URL) information corresponding to the supplementary information to be downloaded.

9. The system as set forth in claim 1, wherein the broadcast content includes PTS information of the specific scene, and wherein the Supplementary Information Service Providing Server creates composition time stamp (CTS) information for synchronizing the PTS information of the specific scene with the supplementary information and provides the user terminal with the supplementary information including the CTS information.

10. The system as set forth in claim 9, wherein the Time Information Creating Server directs the Supplementary Information Service Providing Server to create the CTS information and bidirectional data broadcasting supplementary information including the CTS information.

11. The system as set forth in claim 1, wherein the broadcast content includes PTS information of the specific scene, and wherein the Time Information Creating Server creates CTS information for synchronizing the PTS information of the specific scene with the supplementary information and provides the Supplementary Information Service Providing Server with the CTS information, and wherein the Supplementary Information Service Providing Server provides the user terminal with the supplementary information including the CTS information.

12. The system as set forth in claim 11, wherein the Time Information Creating Server forms bidirectional data broadcasting supplementary information including the CTS information, and wherein the Supplementary Information Service Providing Server extracts a corresponding bidirectional data broadcasting supplementary information including the CTS information, based on the PTS information of the specific scene, and transmits the extracted bidirectional data broadcasting supplementary information to the user terminal.

13. A method for providing a supplementary information service related to broadcast content being broadcasted to a user terminal, the method comprising steps of:
identifying start time information with respect to a start time of the broadcast content;
receiving a supplemental information request;
calculating an elapsed time for a specific scene based on the start time information;
providing the user terminal with supplementary information corresponding to the specific scene based on the elapsed time, through a communication network
receiving a supplementary information request and scene time information of the specific scene from the user terminal,
wherein the elapsed time is calculated based on the start time information and the scene time information of the specific scene, and
coordinate information is further received at the step of receiving, and wherein the supplementary information corresponding to the specific scene is extracted based on both of the elapsed time and the coordinate information.

14. The method as set forth in claim 13, further comprising a step of:
extracting the supplementary information, the supplementary information being to be provided to the user terminal, corresponding to the elapsed time calculated based on the start time information and the scene time information of the specific scene,
wherein the start time information includes first presentation time stamp (PTS) information and absolute time information, and the scene time information of the specific scene includes second PTS information of the specific scene.

15. The method set forth in claim 13, wherein the providing of the supplementary information comprises providing the user terminal with uniform resource locator (URL) information corresponding to the supplementary information to be downloaded.

16. The method set forth in claim 13, wherein the providing of the supplementary information comprises providing the user terminal with the supplementary information including composition time stamp (CTS) information, and
wherein the broadcast content includes PTS information of the specific scene, and the CTS information is created for synchronizing the PTS information of the specific scene with the supplementary information.

* * * * *